(12) United States Patent
Harris et al.

(10) Patent No.: US 11,370,017 B2
(45) Date of Patent: Jun. 28, 2022

(54) AIR MANAGEMENT OF HONEYCOMB COMPOSITE INSERTS

(71) Applicant: THE BOEING COMPANY, Chicago, IL (US)

(72) Inventors: Jeremy P. Harris, Hanahan, SC (US); Timothy Mark Jones, Summerville, SC (US); Lauryn T. Zolondek, Mount Pleasant, SC (US)

(73) Assignee: THE BOEING COMPANY, Chicago, IL (US)

( * ) Notice: Subject to any disclaimer, the term of this patent is extended or adjusted under 35 U.S.C. 154(b) by 392 days.

(21) Appl. No.: 15/414,735

(22) Filed: Jan. 25, 2017

(65) Prior Publication Data
US 2018/0207708 A1    Jul. 26, 2018

(51) Int. Cl.
*B21D 53/92*    (2006.01)
*F16B 23/00*    (2006.01)
*F16B 19/02*    (2006.01)
*F16B 5/01*    (2006.01)

(52) U.S. Cl.
CPC ............. *B21D 53/92* (2013.01); *F16B 5/01* (2013.01); *F16B 19/02* (2013.01); *F16B 23/00* (2013.01)

(58) Field of Classification Search
CPC . B21D 53/92; F16B 5/01; F16B 19/02; F16B 23/00
See application file for complete search history.

(56) References Cited

U.S. PATENT DOCUMENTS 2,957,196 A * 10/1960 Delgadillo ............... F16B 5/01
                                                           16/2.1
2,959,999 A * 11/1960 Wing ................... B21J 15/043
                                                           411/49

(Continued)

FOREIGN PATENT DOCUMENTS

DE          2750829 A1   5/1979
DE    202008001093 U1   6/2009

(Continued)

OTHER PUBLICATIONS

Extended European Search Report for EP Application No. 17203704.6 dated Jun. 18, 2018.

(Continued)

*Primary Examiner* — Nirvana Deonauth
(74) *Attorney, Agent, or Firm* — Marshall, Gerstein & Borun LLP

(57) ABSTRACT

A fastener assembly includes a base which defines a bore which extends through the base. The fastener assembly further includes a receptacle wherein the receptacle includes a sidewall wherein the sidewall defines a channel which extends through the receptacle. The channel extends from a first opening defined by the sidewall to a second opening defined by the sidewall and the sidewall is connected to the base wherein the second opening aligns with the bore of the base. The sidewall of the receptacle defines a vent opening which extends through the sidewall. The receptacle and the base define a flow path through the vent opening of the sidewall, through the channel of the receptacle, through the second opening of the sidewall of the receptacle and through the bore of the base.

20 Claims, 7 Drawing Sheets

(56) References Cited

U.S. PATENT DOCUMENTS

| | | | | |
|---|---|---|---|---|
| 3,322,449 A | * | 5/1967 | Becker | F16B 19/1072 |
| | | | | 403/388 |
| 4,399,642 A | | 8/1983 | Bard et al. | |
| 4,557,100 A | | 12/1985 | Gorges | |
| 5,093,957 A | | 3/1992 | Do | |
| 2007/0048106 A1 | * | 3/2007 | Christ | F16B 37/048 |
| | | | | 411/82 |
| 2007/0228216 A1 | | 10/2007 | Wenstrom | |
| 2014/0334892 A1 | | 11/2014 | Baratta | |
| 2016/0083072 A1 | | 3/2016 | Koreis | |
| 2017/0080674 A1 | * | 3/2017 | Patel | B32B 3/12 |

FOREIGN PATENT DOCUMENTS

| | | |
|---|---|---|
| DE | 202008013067 U1 | 2/2010 |
| EP | 3059459 A1 | 8/2016 |
| FR | 2589406 A1 | 5/1987 |
| GB | 2421556 A | 6/2006 |
| JP | 2004240224 A | 8/2004 |
| JP | 2007307720 A | 11/2007 |
| JP | 2012513552 | 6/2012 |
| JP | 2013216380 A | 10/2013 |
| JP | 2016512589 A | 4/2016 |
| JP | 2016151336 A | 8/2016 |
| TW | 467029 U | 12/2001 |
| WO | WO-2011031806 A1 | 3/2011 |
| WO | WO-2014121105 A1 | 8/2014 |

OTHER PUBLICATIONS

Communication Pursuant to Article 94(3) EPC for EP Application No. 17203704.6 dated Dec. 2, 2019.
Communication Pursuant to Article 94(3) EPC for EP Application No. 17203704.6 dated Apr. 23, 2021.
Notice of Reasons for Rejection for JP Application No. 2017-194120 dated Jul. 5, 2021.
Notification of First Office Action for CN Application No. 2017112347740 dated Mar. 16, 2022.

* cited by examiner

AIR MANAGEMENT OF HONEYCOMB COMPOSITE INSERTS

FIELD

This disclosure relates to venting of air from within a structure and more particularly to venting air from a composite honeycombed core panel.

BACKGROUND

At the time of installation of a composite structure assembly, such as those which include panels which sandwich a honeycomb core, gases such as air are trapped within the composite structure assembly. This can occur during installation of the composite structure assembly into an aircraft and become problematic. The composite structure assembly will include a hole which extends through the composite structure assembly inclusive of the outer skins or panels and the honeycomb core. The hole accommodates a fastener and a fastener bracket. The fastener is used in association with the fastener bracket to secure the composite structure assembly to another structure. During installation the fastener bracket is secured or adhered to one side of the composite structure assembly. With the fastener extended through the bracket to secure to another structure the fastener and the bracket create an air tight seal of the hole associated with one side of the hole. With the composite structure assembly secured, installation of an overlay takes place on an opposing side of the composite structure assembly.

Overlays can include a wide variety of coverings such as a carpet tape or galley mat for a floor structure or a decorative covering for an interior cabin structure of an aircraft. With, for example, a galley mat positioned on an opposing side of the composite structure assembly, the galley mat is adhered to the composite structure assembly sealing closed air tight an opposing side of the hole of the composite structure assembly. With installation of the composite structure assembly secure and the covering installed, the hole is closed and is sealed air tight.

The trapped air within the hole will be at approximately the ambient air pressure that existed at the time of installation of the composite structure assembly and installation of the overlay which seals closed the hole which accommodates the fastener and fastener bracket used to install the composite structure assembly. As the aircraft gains altitude in flight, for example, the air pressure exerted against the overlay from outside of the composite structure assembly is reduced relative to the air pressure that is trapped within the air tight sealed hole. The relatively higher air pressure within the hole causes the overlay to be deformed and bulge or bubble at the location of the hole in a direction away from the composite structure assembly. The bulging or bubbling effect changes as the air pressure positioned outside of the bore against the overlay changes. The bubbling phenomenon will subside with the aircraft returning to an altitude wherein the pressure exerted against the overlay from outside of the composite structure assembly and the pressure positioned within the hole on an opposing side of the overlay become more equalized or balanced.

The bubbling or bulging effect imparted to the overlay, for example, can cause an overlay to protrude upwardly from a floor and present an undesired hazard in walking on the overlay or create an obstruction in moving items across the overlay during flight. In other examples of the composite structure assembly being positioned, for an example, to be a wall structure and the overlay is a decorative covering. The decorative covering would be similarly distorted based on an imbalance of air pressure being for example higher within the hole accommodating the fastener and the fastener bracket within the composite structure assembly than the air pressure positioned outside of the composite structure assembly being exerted onto the decorative covering which extends over the hole.

There is a need to mitigate or eliminate the distortion of an overlay which seals air tight closed a hole which accommodates a fastener assembly within a composite structure assembly. As a result, there is a need to equalize air pressure between air which is trapped within the hole of the composite structure assembly during installation of the composite structure assembly and the air pressure outside the hole being exerted against the overlay positioned covering the hole to mitigate or avoid distortion of the overlay during flight of an aircraft.

SUMMARY

An example includes a fastener assembly which includes a base having a bore which extends through the base. The fastener assembly further includes a receptacle wherein the receptacle includes a sidewall. The sidewall defines a channel which extends through the receptacle and the channel extends from a first opening defined by the sidewall to a second opening defined by the sidewall. The sidewall is connected to the base wherein the second opening aligns with the bore of the base. The sidewall of the receptacle further defines a vent opening which extends through the sidewall. The receptacle and the base define a flow path through the vent opening of the sidewall, through the channel of the receptacle, through the second opening of the sidewall of the receptacle and through the bore of the base.

Another example includes a fastener assembly which includes a base which defines a bore which extends through the base. The fastener assembly further includes a receptacle which includes a sidewall wherein the sidewall defines a channel which extends through the receptacle. The channel extends from a first opening defined by the sidewall to a second opening defined by the sidewall and the sidewall is connected to the base wherein the second opening aligns with the bore of the base. The fastener assembly further includes a head connected to a shaft wherein the fastener defines a channel which extends through the head and through the shaft and the fastener channel extends from a first opening defined by the head to a second opening defined by the shaft. The head has a greater dimension than the first opening defined by the sidewall of the receptacle such that with the head positioned in a covering position with respect to the first opening of the sidewall, the shaft extends through the channel of the receptacle and the shaft extends through the bore of the base. A flow path is defined to extend from the first opening defined by the head, through the fastener channel and through the second opening of the shaft.

Another example includes a method for venting a honeycomb core panel which includes a first panel spaced apart from a second panel and a honeycomb structure positioned between the first and second panel. The method includes the step of forming a hole within the honeycomb core panel which extends through the first panel, honeycomb structure and the second panel The method further includes the step of inserting a receptacle into the hole wherein the receptacle has a sidewall defining a channel which extends through the receptacle from a first opening defined by the sidewall to a second opening defined by the sidewall. The sidewall defines a vent opening positioned between the first and second openings providing access from an outside surface of the sidewall to the channel and the step of inserting the receptacle further includes securing a base, which is connected to the sidewall and the second opening aligns with the bore of the base, to the second panel. The method further includes the step of inserting a fastener into the channel, wherein the fastener includes a head and a shaft connected to the head, wherein the head has a larger dimension than the first opening of the receptacle and the shaft has a smaller dimension than the channel of the receptacle and the bore of the base. With the head positioned closing the first opening of the receptacle the shaft extends through the channel, through the bore of the base and out of the bore of the base forming a flow path through the vent opening, through the channel of the receptacle and through the bore of the base.

Another example includes a method for venting a honeycomb core panel comprising a first panel spaced apart from a second panel and a honeycomb structure positioned between the first and second panel. The method includes the step of forming a hole within the honeycomb core panel which extends through the first panel, honeycomb structure and the second panel. The method further includes the step of inserting a receptacle into the hole wherein the receptacle has a sidewall defining a channel which extends through the receptacle from a first opening defined by the sidewall to a second opening defined by the sidewall and securing a base, which is connected to the sidewall and the second opening aligns with the bore of the base, to the second panel. The method further includes the step of inserting a fastener into the channel wherein the fastener includes a head connected to a shaft and the head has a greater dimension than the first opening. The fastener has a fastener channel which extends through the head and through the shaft and extends from a first opening defined by the head to a second opening defined by the shaft. With the head positioned covering the first opening of the sidewall, the shaft extends through the channel of the receptacle and through the bore of the base forming a flow path with the fastener channel extending from the first opening, which is positioned within the hole and which is defined by the head, and extending through the head and the shaft through a second opening of the shaft.

The features, functions, and advantages that have been discussed can be achieved independently in various embodiments or may be combined in yet other embodiments further details of which can be seen with reference to the following description and drawings.

DESCRIPTION

As mentioned earlier, there is a need to maintain a balance between air pressure within a hole of a composite structure assembly which accommodates a fastener assembly and air pressure exerted against an overlay which covers the composite structure assembly and the hole. With maintaining a balance between the air pressures, the overlay positioned covering the hole will maintain a flattened position across the hole with an aircraft gaining and reaching altitude in flight.

Figure 1:
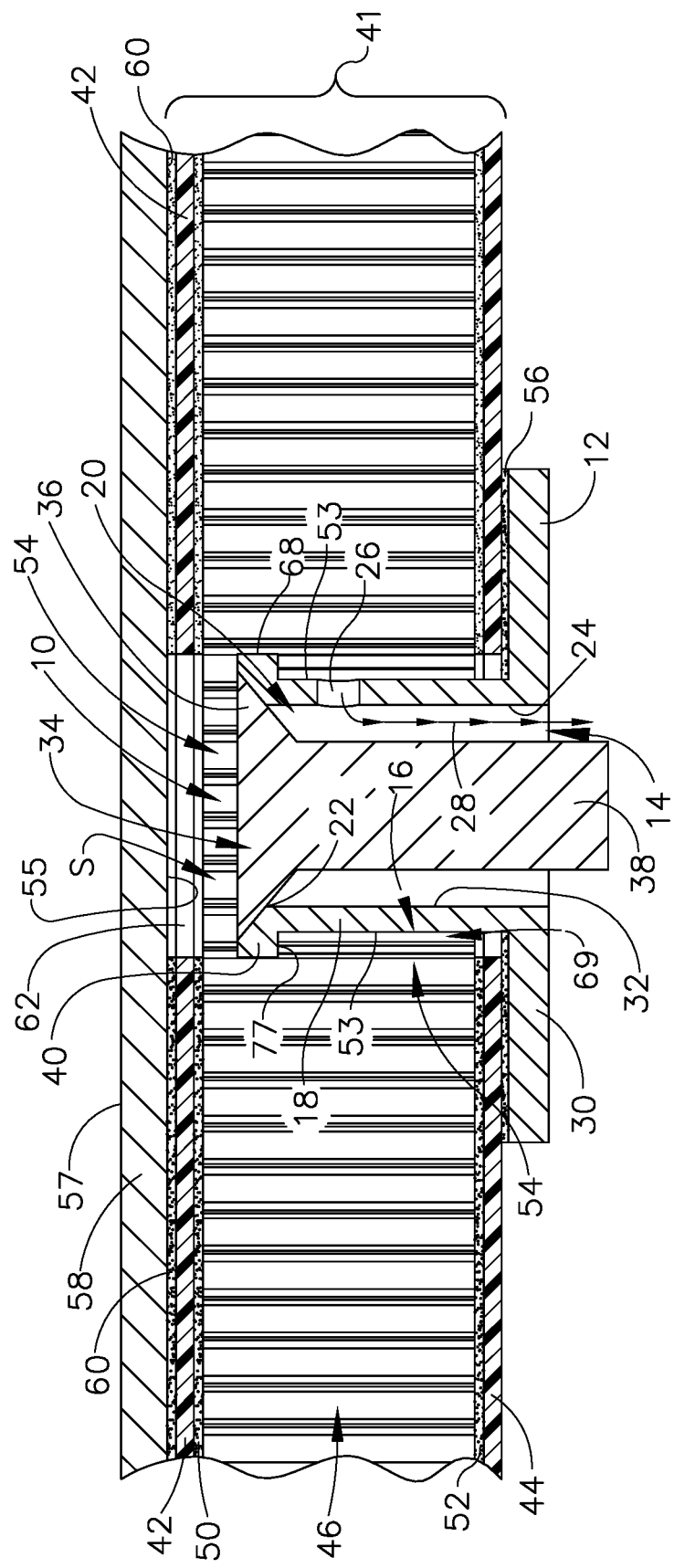
FIG. 1 is a cross section view of a first example of a fastener assembly securing a composite structure assembly which includes panels which sandwich a honeycomb core.
Figure 2:
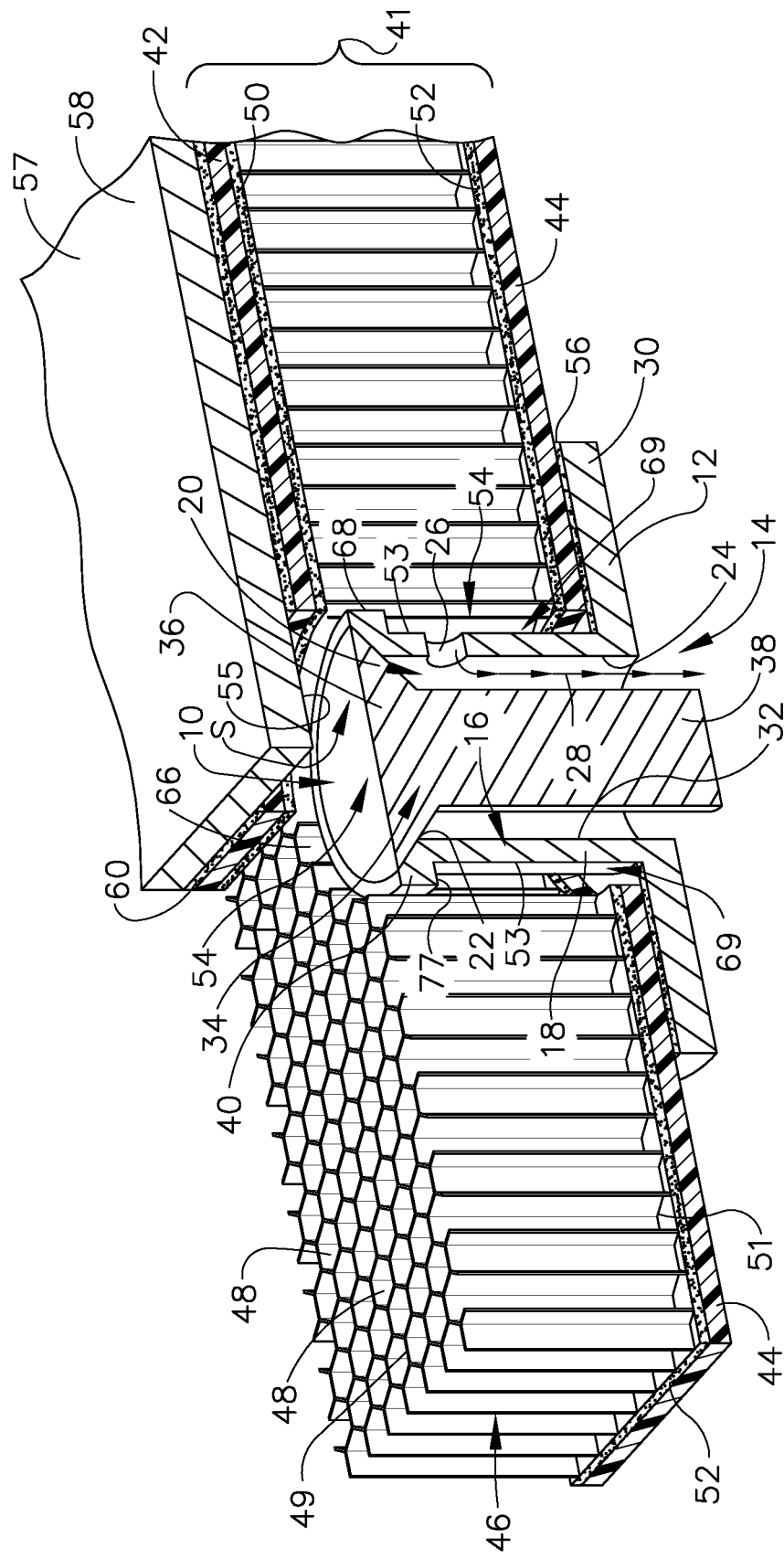
FIG. 2 is a perspective view of FIG. 1 with the composite structure assembly partially broken away.
Figure 3:
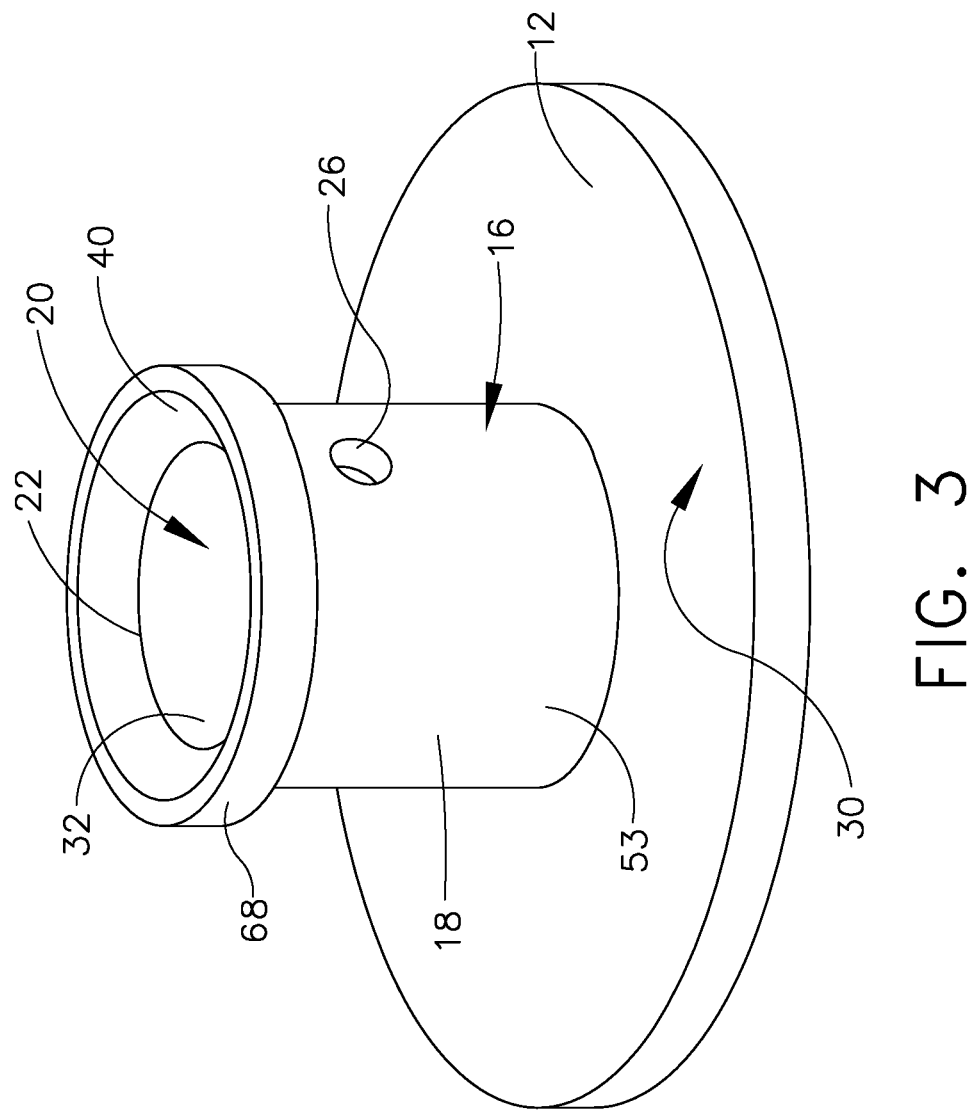
FIG. 3 is a perspective view of the receptacle and the base of the fastener assembly of FIG. 1.

In referring to FIGS. 1-3, a first example of fastener assembly 10 is shown which provides a balance of air pressures to maintain an overlay in a more flattened position and mitigate or eliminate distortion of the overlay as an aircraft gains and obtains altitude in flight. First example of fastener assembly 10 includes base 12 which includes bore 14 which extends through base 12. Base 12 is constructed of a strong material such as a metal, composite or comparably strong material. Fastener assembly 10 further includes receptacle 16, wherein receptacle 16 includes sidewall 18 which is also constructed of a strong material such as that which is employed for base 12. Sidewall 18 defines channel 20 which extends through receptacle 16. In referring to FIGS. 1 and 2, channel 20 extends from a first opening 22 defined by sidewall 18 to second opening 24 defined by sidewall 18.

Base 12 and sidewall 18 of receptacle 16 are connected together and in this example are constructed as a single piece construction. Base 12 and sidewall 18 of receptacle 16 are made of the same material such as metal. Base 12 and receptacle 16 can also be constructed of separate pieces and secured together by traditional methodologies such as welding or bonding. With base 12 and sidewall 18 connected together second opening 24 of sidewall 18 aligns with bore 14 of base 12.

Sidewall 18, as seen in FIGS. 1-3 of receptacle 16 further defines vent opening 26 which extends through sidewall 18 providing access from outside of sidewall 18 to channel 20. Receptacle 16 and base 12 define a flow path 28 which extends through vent opening 26 of sidewall 18, through channel 20 of receptacle 16 and through second opening 24 of sidewall 18 of receptacle 16. Flow path 28 continues and extends through bore 14 of base 12. As will be discussed herein, flow path 28 allows air positioned outside of vent opening 26 and channel 20 to move along flow path 28 and out of bore 14 of base 12.

Base 12 is, in this example, constructed of an annular plate 30. Base 12 and bore 14 can be constructed of a shape as needed or desired by the fabricator. Base 12 extends in a direction transverse away from sidewall 18 of receptacle 16. This configuration as will be discussed herein facilitates securing base 12. Interior surface 32, in this example, of sidewall 18 defines a cylindrical shaped boundary for channel 20 which can also be constructed of a shape as needed or desired by the fabricator.

Fastener assembly 10 further includes fastener 34 which, in this example, includes head 36 connected to shaft 38. Head 36 has a greater dimension than a dimension of first opening 22 of sidewall 18 of receptacle 16, such that with fastener 34 in a secured position, head 36 is positioned closing first opening 22 and closes one end of channel 20 as will be further discussed herein. Shaft 38 has a smaller dimension than channel 20. With shaft 38 positioned within channel 20 of receptacle 16, shaft 38 of fastener 34 is positioned spaced apart from sidewall 18 of receptacle 16.

In this example, countersink wall 40 is provided connected to sidewall 18 such that with head 36 positioned on countersink wall 40 head 36 is positioned closing first opening 22 and shaft 38 extends through channel 20 of receptacle 16 and through bore 14 of base 12. With fastener 34 in a secured or connected position securing composite structure 41 to another structure (not shown) head 36 is received onto countersink wall 40 covering first opening 22.

Composite structure assembly 41, which will be secured for example within an aircraft and provide a structural component for a floor or other interior structure within an aircraft cabin. Composite structure assembly 41 includes first panel 42 spaced apart from second panel 44. First and second panels 42 and 44 are each, in this example, constructed of composite material. Positioned in between first and second panels 42 and 44 is a honeycomb core 46, which also, in this example, is constructed of composite material. Honeycomb core 46 is a reinforcement structure for composite structure assembly 41 and includes a number of hollow tube structures 48 that extend between first and second panels 42 and 44. Each hollow tube structure 48 provides an open space within structures 48 which extends between the first and second panels 42 and 44 such that composite structure assembly 41 provides a strong and light weight construction.

Hollow tube structures 48 that extend between the first and second panels 42 and 44 can be constructed forming one from a number of different shapes or configurations which define open spaces between first and second panels 42, 44. In this example, each hollow tube structure 48 forms a hexagon shaped opening. Hollow tube structures 48 are positioned in adjacent relationship with other similarly shaped hollow tube structures 48, as seen in FIGS. 1 and 2. First end 49 of hollow tube structure 48 is secured to first panel 42 with an adhesive 50 and second end 51 of hollow tube structure 48 is secured to second panel 44 with an adhesive 52.

Hole 54 defined by and which extends through first panel 42, honeycomb core 46 and second panel 44. Hole 54 is, in this example, formed with drilling through composite structure assembly 41. In referring to FIGS. 1 and 2, at least a portion of receptacle 16 is positioned within hole 54 and base 12 is adhered to second panel 44 with adhesive 56 providing an air tight seal between base 12 and second panel 44. Overlay 58 is positioned extending across and covering first panel 42 and hole 54. Overlay 58 is adhered to first panel 42 with adhesive 60 forming an air tight seal between overlay 58 and first panel 42 and with being adhered to first panel 42 about hole 54 an air tight seal is formed by overlay 58 with hole 54 at first panel 42. As mentioned earlier, overlay 58 can include one of a number of coverings that would be applied in a covering relationship with composite structure assembly 41. Overlays can include a tape, carpet, galley mat, decorative wall covering and the like. Side 55 of overlay 58 is positioned to extend across hole 54 at first panel 42 and faces head 36 of fastener 34. In this example, countersink wall 40 and head 36 are positioned within hole 54 spaced apart from side 55 of overlay 58 forming a spaced apart region S there between within hole 54, as seen in FIGS. 1 and 2.

In referring to FIGS. 1-3, in this example, air flow is provided from spaced apart region S to vent opening 26 and thereafter along flow path 28. Air from spaced apart region S can flow along outer wall surface 68 of countersink wall 40 within pocket configuration 66, to be described in more detail below. The air flows along outside surface 53 of sidewall 18 of receptacle 16 within hole 54 which accesses vent opening 26. With a reduction in air pressure which occurs outside of composite structure assembly 41, a relatively higher air pressure within hole 54 forces air from the spaced apart region S across countersink wall 40 and outer wall surface 68 of countersink wall 40. As the air passes along outer wall surface 68 of counter sink wall 40 within air pocket configuration 66, the air accesses outer surface 53 of sidewall 18 and travels along sidewall 18 to and through vent opening 26 to follow flow path 28 exiting air out of hole 14 and more particularly reducing the air pressure within spaced apart region S. With the reduction of air pressure within spaced apart region S within hole 54 that is exerted on side 55 of overlay 58, the air pressure exerted on side 55 becomes more equalized with the air pressure positioned against opposing side 57 of overlay 58 which is aligned with hole 54.

In this example, hole 54 was formed, as mentioned above, by drilling through first panel 42, honeycomb core 46 and second panel 44. Other methodologies can be applied to form hole 54 as well as providing a shape of hole 54 as desired. As a result of hole 54 being, in this example, drilled, a cylindrical shaped hole 62 extends through first panel 42 and a cylindrical shaped hole extends through second panel 44. With countersink wall 40 having a greater dimension than receptacle 16, hole 54 is drilled to accommodate the dimension of countersink wall 40. As a cylindrical shaped drill bit cuts through honeycomb core 46, at least some of the hollow tube structures 48 are at least partially cut open positioning the inside of hollow structure 48 forming open pocket structure 66 adjoining outside wall surface 68 of countersink wall 40. This permits air to travel from spaced apart region S along outside wall surface 68 and through open pocket structure 66 and reach a region 69 positioned between outer surface 53 of sidewall 18 and honeycomb core 46. The air passes along outer surface 53 and accesses vent opening 26. Region 69 was formed with the drilling of hole 54 being drilled to accommodate the dimension of countersink wall 40 which is greater than the dimension of receptacle 16 resulting in region 69 positioned between sidewall 18 and honeycomb structure 46.

Open pocket configurations 66 provide spaced apart region S to be in fluid communication with open space 69 such that with a higher air pressure positioned in spaced apart region S than is positioned outside of composite structure assembly 41, air can flow from spaced apart region S, through open pocket configuration 66, to open space 69 along outer surface wall 53 to vent opening 26. The air reaching vent opening 26 follows flow path 28 and exits through bore 14 of base 12 reducing the air pressure positioned in spaced apart region S within composite structure assembly 41. This results in balancing the air pressure between spaced apart region S with the air pressure being exerted on opposing side 57 of overlay 58 which covers hole 54. With the balancing of these air pressures, overlay 58 maintains a flattened position for overlay 58 which covers hole 54.

Figure 4:
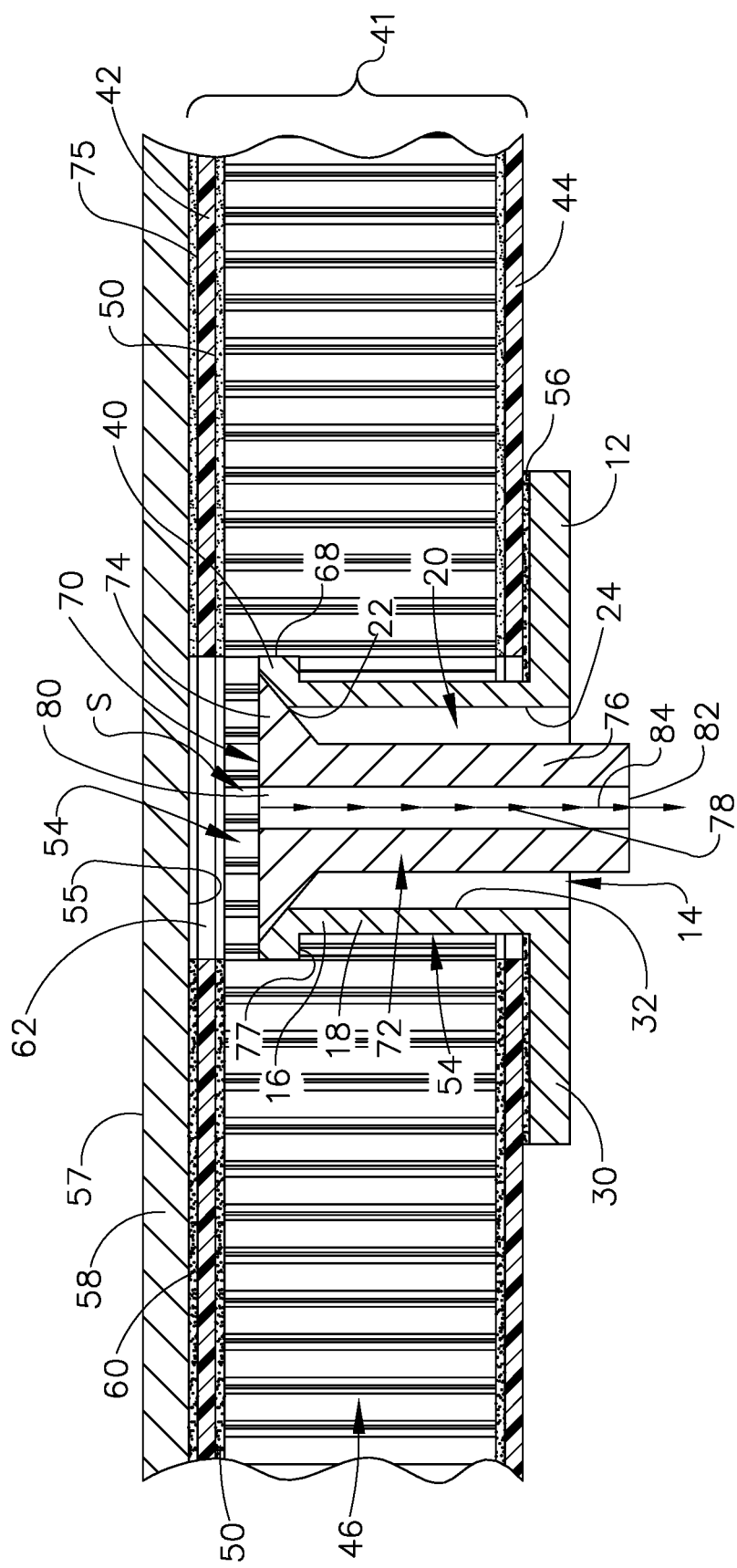
FIG. 4 is a cross section view of the second example of a fastener assembly securing a composite structure assembly which includes panels which sandwich a honeycomb core.
Figure 5:
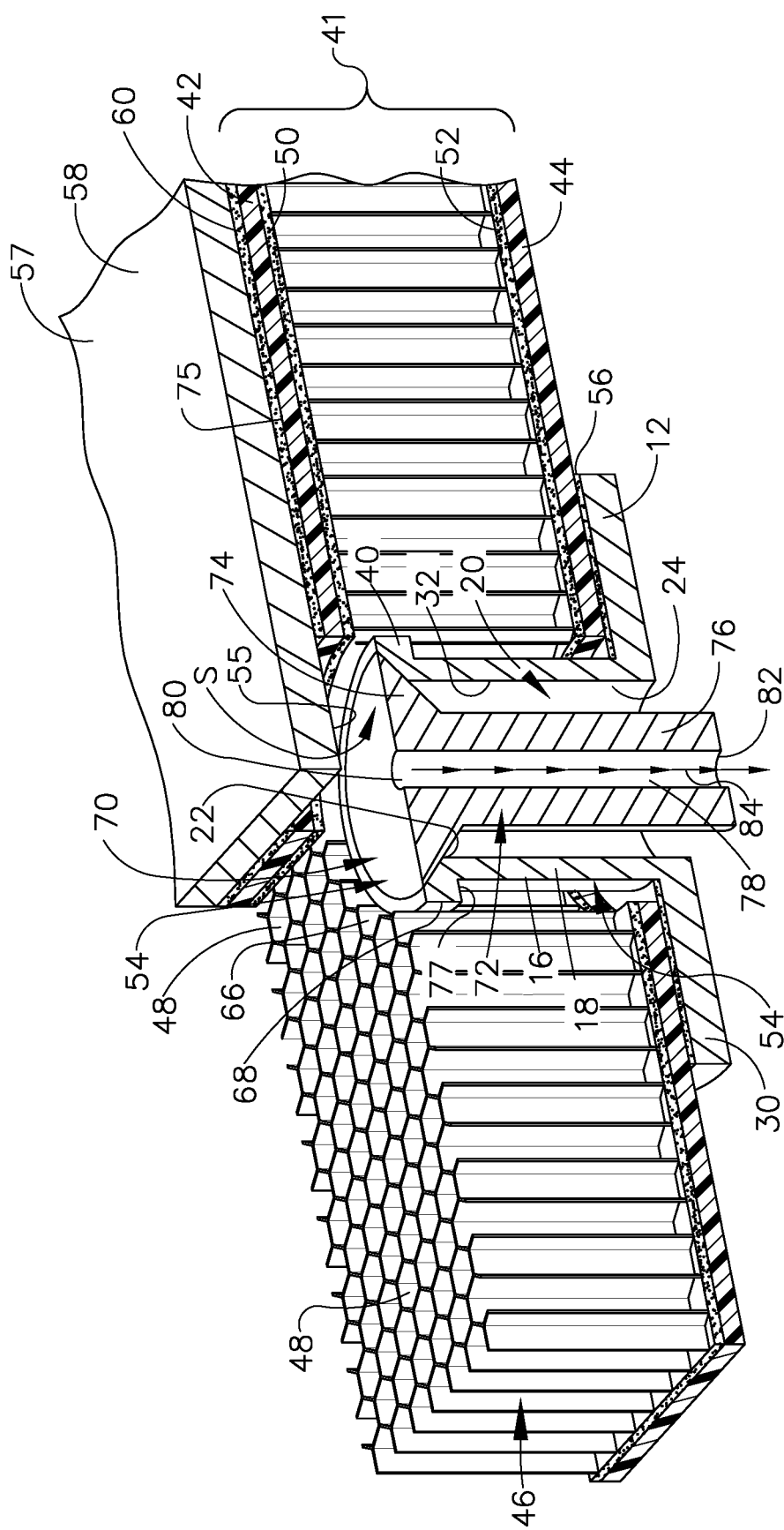
FIG. 5 is a perspective view of FIG. 4 with the composite structure assembly partially broken away.

In referring to FIGS. 4 and 5, a second example of fastener assembly 70 is shown. Where structures utilized in this second example of fastener assembly 70 are similar to those found in the first example of fastener assembly 10, the same numbering will be utilized. Second fastener assembly 70 includes base 12 which defines bore 14 which extends through base 12. Receptacle 16 is connected to base 12. As discussed earlier base 12 and receptacle 16 can be a single piece construction or two pieces which are secured together by one of a number of methodologies including welding or bonding or the like. Receptacle 16 includes sidewall 18, wherein sidewall 18 defines channel 20 which extends through receptacle 16. Channel 20 extends from first opening 22 defined by sidewall 18 to second opening 24 defined by sidewall 18. As mentioned above, sidewall 18 is connected to base 12 wherein second opening 24 aligns with bore 14 of base 12.

In this example, fastener 72 includes head 74 connected to shaft 76. Fastener 72 defines fastener channel 78 which extends through head 74 and through shaft 76. Fastener channel 78 extends from first opening 80 defined by head 74 to second opening 82 defined by shaft 76. Head 74 has a greater dimension than first opening 22 defined by sidewall 18 of receptacle 16 such that, with head 74 positioned in a covering position with respect to first opening 22 of sidewall 18 shaft 76 extends through channel 20 of receptacle 16 and through bore 14 of base 12. Flow path 84 is defined from first opening 80 defined by head 74 through fastener channel 78 which extends through head 74. Flow path 84 continues to extend through shaft 76 and through second opening 82 defined by shaft 76.

As discussed earlier for fastener assembly 10, second fastener assembly 70 includes base 12 including, in this example, annular plate 30 which extends in a transverse direction away from sidewall 18 of receptacle 16. Interior surface 32 in this example of sidewall 18 defines a cylindrical shaped boundary for channel 20. As also discussed earlier, both base 12 and interior surface 32 of sidewall 18 can be of a shape selected from a number of shapes as needed by the fabricator. Shaft 76 has a smaller dimension than channel 20 within receptacle 16. Countersink wall 40, in this example, is connected to the sidewall 18 such that at least a portion of head 74 is positioned with head 74 positioned in a covering position with respect to first opening 22 of receptacle 16 as seen in FIGS. 4 and 5.

Fastener assembly 70 further includes first panel 42 spaced apart from second panel 44 with honeycomb core 46 positioned between. Honeycomb core 46 is secured to first and second panels 42, 44 constructing composite structural assembly 41 as discussed earlier. Hole 54 is defined by and extends through first panel 42, honeycomb core 46 and second panel 44. With at least a portion of receptacle 16 positioned within hole 54 base 12 is adhered to second panel 44 with adhesive 56 providing an air tight seal between base 12 and second panel 44.

Overlay 58, as discussed earlier, can include one of a number of coverings such as a tape, carpet, galley mat, decorative wall covering and the like. Overlay 58 is positioned covering first panel 42 and hole 54 which extends through first panel 42. Overlay 58 is adhered to first panel 42 with adhesive 60 providing an air tight seal between overlay 58 and first panel 42.

With overlay 58 adhered to first panel 42 and covering head 74 and countersink wall 40 and with side 55 of overlay 58 spaced apart from head 74 and countersink wall 40, spaced apart region S is formed. Spaced apart region S is in fluid communication with first opening 80 and fastener channel 78, such that with a reduction of air pressure occurring outside of composite structural assembly 41, a relatively higher air pressure in hole 54 pushes air in spaced apart region S within hole 54 through first opening 80 through fastener channel 78 and out of second opening 82. As a result, air pressure within spaced apart region S reduces and brings air pressure within spaced apart region S exerting force on side 55 of overlay 58 into balance with the air pressure positioned outside of composite structural assembly 41 exerting force against opposing side 57 of overlay 58 at a position corresponding to hole 54. The equalization of the pressures on side 55 and opposing side 57 of overlay 58 results in overlay 58 maintaining a flattened position as the aircraft gains and reaches altitude.

Figure 6:
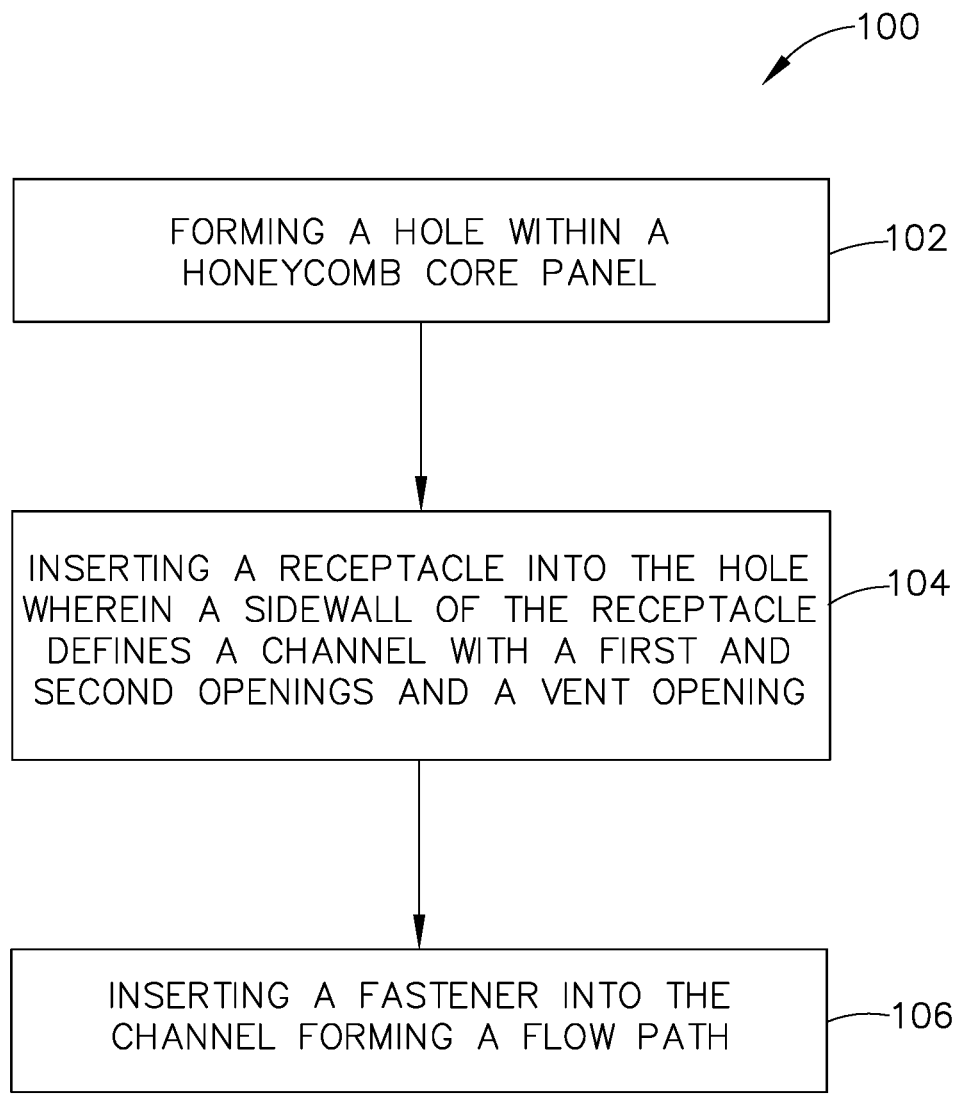
FIG. 6 is a flow chart of a first example of a method of venting a honeycomb core panel.

In referring to FIG. 6, a method 100 is provided for venting a honeycomb core panel such as composite structure assembly 41, as seen in FIGS. 1-3. Honeycomb core panel 41 includes first panel 42 spaced apart from second panel 44 and honeycomb structure 46 positioned between the first and second panels 42 and 44. Method 100 includes step 102 for forming hole 54, as earlier described, within honeycomb core panel 41 which extends through first panel 42, honeycomb structure 46 and second panel 44. Method 100 further includes step 104 of inserting receptacle 16 into hole 54 wherein receptacle 16 has sidewall 18 defining channel 20 which extends through receptacle 16 from first opening 22 defined by sidewall 18 to second opening 24 defined by sidewall 18. In receptacle 16, sidewall 18 defines vent opening 26 positioned between first and second openings 22 and 24 providing access from an outside surface 53 of sidewall 18 to channel 20. Also included in step 104 is securing base 12, which is connected to sidewall 18 and second opening 24 is aligned with bore 14 of base 12, to second panel 44.

Method further includes step 106 of inserting fastener 34 into channel 20, wherein fastener 34 includes head 36 and shaft 38 connected to head 36. Head 36 has a larger dimension than first opening 22 of receptacle 16 and shaft 38 has a smaller dimension than channel 20 of receptacle 16 and bore 14 of base 12. With head 36 positioned closing first opening 22 of receptacle 16, shaft 38 extends through channel 20 and through bore 14 of base 12 and out of bore 14 of base 12 forming flow path 28 through vent opening 26, through channel 20 of receptacle 16 and through bore 14 of base 12.

Step 102 of forming hole 54 includes drilling hole 54 through honeycomb structure 46, which includes a plurality of hollow tube structures 48 wherein each hollow tube structure 48 has first end 49 adhered to first panel 42 and second end 51 adhered to second panel 44. Drilling includes cutting a sidewall (not shown) of at least one hollow tube structure 48 forming an open pocket configuration 66, as seen in FIG. 2.

Step 104 of inserting receptacle 16 into hole 54 includes positioning sidewall 18 of receptacle 16 and vent opening 26 adjoining at least one open pocket configuration 66. The step of securing the base 12 includes adhering base 12 to second panel 44 with an adhesive 56 forming an air tight seal between base 12 and second panel 44.

Step 104 of inserting receptacle 16 into hole 54 includes inserting an end 77 of receptacle 16 through hole 54 at second panel 44 and positioning end 77 of receptacle 16 spaced apart from outer surface 75 of first panel 42. Further included in method 100 is a step of positioning an overlay 58 onto outer surface 75 of first panel 42, covering hole 54 positioned at first panel 42 and forming a spaced apart region S within hole 54 positioned between overlay 58 and head 36 of fastener 34, as seen in FIGS. 1 and 2. Further included is the step of adhering overlay 58 to outer surface 75 of first panel 42 forming an air tight seal between overlay 58 and first panel 42.

Figure 7:
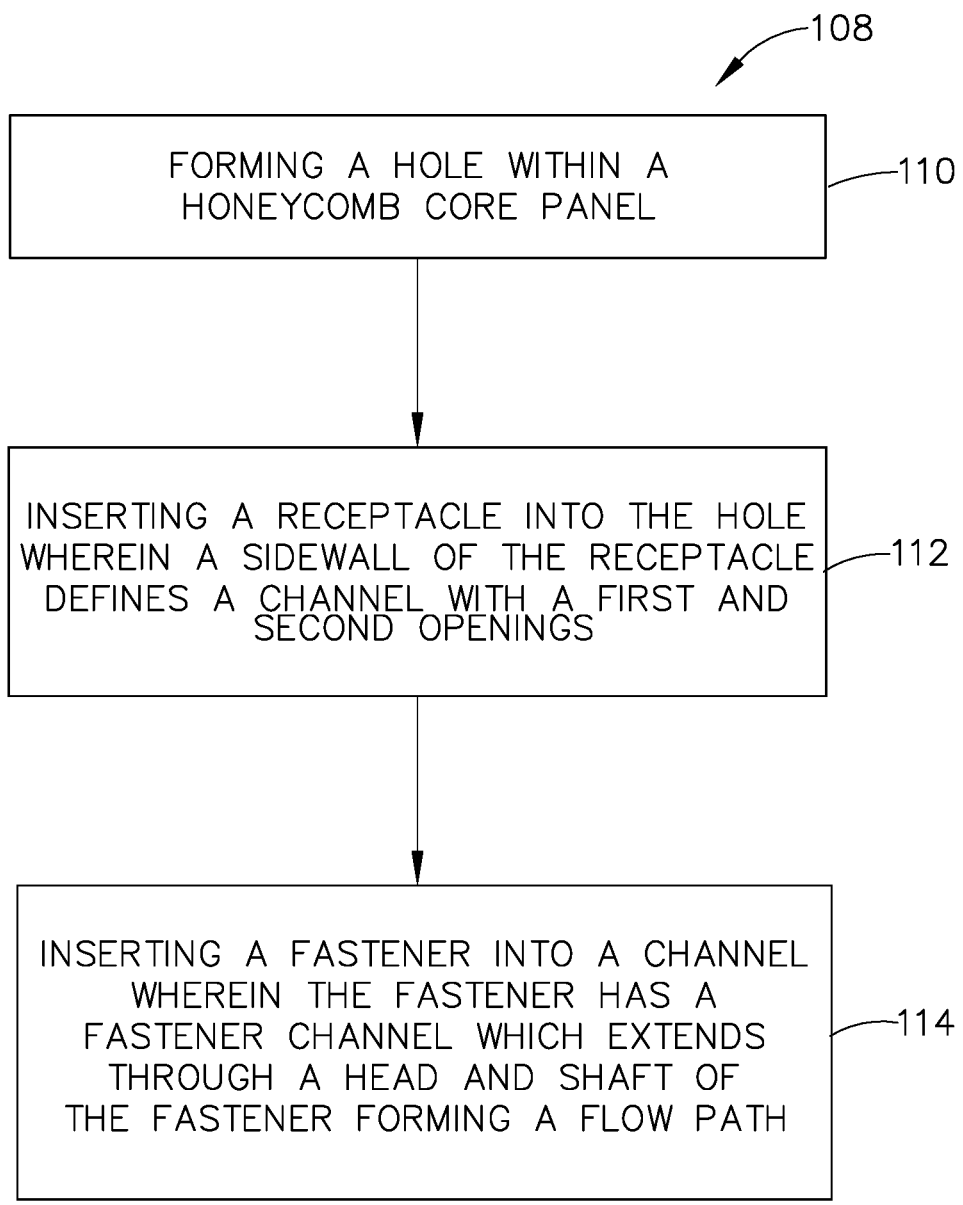
FIG. 7 is a flow chart of a second example of a method of venting a honeycomb core panel.

In referring to FIG. 7, another method 108 for venting honeycomb core panel such as composite structure assembly 41, such as seen in FIGS. 4 and 5, is shown. Composite structure assembly 41 includes first panel 42 spaced apart from second panel 44 and a honeycomb structure 46 positioned between first and second panel 42 and 44. Method 108 includes step 110 of forming hole 54 within honeycomb core panel 41 which extends through first panel 42, honeycomb structure 46 and second panel 44.

Method 108 further includes the step 112 of inserting receptacle 16 into the hole 54 wherein receptacle 16 has sidewall 18 defining channel 20 which extends through receptacle 16 from first opening 22 defined by sidewall 18 to second opening 24 defined by sidewall 18. Step 112 further includes securing base 12, which is connected to sidewall 18 and second opening 24 aligns with bore 14 of base 12, to second panel 44.

Method 108 further includes step 114 of inserting fastener 72 into channel 20 wherein fastener 72 includes head 74 connected to shaft 76 and head 74 has a greater dimension than first opening 22. Fastener 72 has fastener channel 78 which extends through head 74 and through shaft 76. Fastener channel 78 extends from first opening 80, defined by head 74 to second opening 82 defined by shaft 76. With head 74 positioned covering first opening 22 of sidewall 18, shaft 76 extends through channel 20 of receptacle 16 and through bore 14 of base 12 and forming a flow path with the fastener channel extending from the first opening, which is positioned within the hole in fluid communication with spaced apart region S and which is defined by head 74, and extending through head 74 and shaft 76 through second opening 82 of shaft 76.

Step 110 of forming hole 54 includes drilling hole 54 through first and second panels 42 and 44 and honeycomb structure 46. Step 112 of inserting receptacle 16 into hole 54 includes inserting end 77 of receptacle 16 through hole 54 at second panel 44 and positioning end 77 of receptacle 16 spaced apart from outer surface 75 of first panel 42. Step 112 further includes securing base 12 includes adhering base 12 to second panel 44 and forming an air tight seal between base 12 and second panel 44.

Method 108 further includes the step of positioning overlay 58 onto outer surface 75 of first panel 42, covering hole 54 positioned at first panel 42 and forming a spaced apart region S within hole 54 positioned between overlay 58 and head 74 of fastener 72, as seen in FIGS. 4 and 5. Further included is the step of adhering overlay 58 to outer surface 75 of first panel 42 and forming an air tight seal between overlay 58 and first panel 42.

While various embodiments have been described above, this disclosure is not intended to be limited thereto. Variations can be made to the disclosed embodiments that are still within the scope of the appended claims.

What is claimed:

1. A fastener assembly, comprising:
   a base having a bore which extends through the base;
   a receptacle comprising a sidewall, which extends from the base, wherein:
     the sidewall defines a cylinder configuration, which defines a channel, which extends through the receptacle;
     the channel extends from a first opening defined by the sidewall on an opposing side of the receptacle from the base to a second opening defined by the sidewall;
     the sidewall is connected to the base, wherein the second opening is aligned with the bore of the base;
     the sidewall of the receptacle further defines a vent opening which extends through the sidewall wherein the receptacle and the base define a flow path through the vent opening of the sidewall, through the channel of the receptacle, through the second opening of the sidewall of the receptacle and through the bore of the base; and
   a fastener comprising a head connected to a shaft, wherein:
     the head has a greater dimension than a dimension of the first opening; and
     with the head positioned in contact with a countersink wall connected to the sidewall of the receptacle and covering the first opening, the first opening of the receptacle is closed, wherein the flow path further extends from the vent opening along an outside surface of the sidewall of the receptacle and along an outer wall surface of the countersink wall.

2. The fastener assembly of claim 1, wherein the base comprises a plate which extends in a direction transverse away from the sidewall of the receptacle.

3. The fastener assembly of claim 1, wherein the shaft of the fastener has a smaller dimension than the channel within the receptacle such that with the head in contact with the countersink wall the first opening is in a closed position and the shaft is positioned within the channel spaced apart from the sidewall of the receptacle.

4. The fastener assembly of claim 3, wherein with the head positioned in contact with the countersink wall, the shaft extends through the channel of the receptacle and through the bore of the base.

5. A method for installing a fastener assembly, comprising the steps of:
   inserting a receptacle, comprising a sidewall into a hole in a honeycomb structure, wherein:
     the sidewall extends from a base, wherein the base has a bore which extends through the base;
     the sidewall, defines a cylinder configuration, which defines a channel, which extends through the receptacle;
     the channel extends from a first opening defined by the sidewall on an opposing side of the receptacle from the base to a second opening defined by the sidewall;
     the sidewall is connected to the base, such that the second opening is aligned with the bore of the base;
     the sidewall of the receptacle further defines a vent opening which extends through the sidewall such that the receptacle and the base define a flow path through the vent opening of the sidewall, through the channel of the receptacle, through the second opening of the sidewall and through the bore of the base; and
   inserting a fastener into the channel, wherein:
     the fastener comprising a head and a shaft connected to the head;
     the head has a larger dimension than the first opening of the receptacle; and
     with the head positioned in contact with a countersink wall connected to the sidewall of the receptacle, the head covers and closes the first opening of the receptacle, wherein the flow path further extends from the vent opening along an outside surface of the sidewall of the receptacle and along an outer wall surface of the countersink wall.

6. The method of claim 5, wherein the hole in the honeycomb structure is formed by drilling the hole through the honeycomb structure, which comprises a plurality of hollow tube structures wherein each of the hollow tube structures has a first end adhered to a first panel of a honeycomb core panel and a second end adhered to a second panel of the honeycomb core panel.

7. The method of claim 6, wherein the drilling includes cutting a sidewall of at least one hollow tube structure of the plurality of hollow tube structures forming at least one open pocket configuration.

8. The method of claim 7, wherein: the step of inserting the receptacle into the hole in the honeycomb structure includes positioning the sidewall of the receptacle and the vent opening adjoining the at least one open pocket configuration.

9. The method of claim 5, wherein the step of inserting the receptacle into the hole in the honeycomb structure includes inserting an end of the receptacle through a hole in a second panel of a honeycomb core panel and positioning the end of the receptacle spaced apart from an outer surface of a first panel of the honeycomb core panel.

10. The method of claim 9, further including a step of positioning an overlay onto the outer surface of the first panel, covering a hole in the first panel and forming a spaced apart region between the overlay and the head of the fastener.

11. The method of claim 10, further including a step of adhering the overlay to the outer surface of the first panel forming an air tight seal between the overlay and the first panel.

12. A fastener assembly, comprising:
a base which has a bore which extends through the base;
a receptacle comprising a sidewall, which extends from the base, wherein:
the sidewall defines a channel which extends through the receptacle;
the channel extends from a first opening defined by the sidewall on an opposing side of the receptacle from the base to a second opening defined by the sidewall;
the sidewall is connected to the base wherein the second opening aligns with the bore of the base; and
the sidewall of the receptacle further defines a vent opening which extends through the sidewall wherein the receptacle and the base define a flow path through the vent opening of the sidewall, through the channel of the receptacle, through the second opening of the sidewall of the receptacle and through the bore of the base; and
the receptacle is positioned within a hole which extends through a honeycomb core panel comprising a first panel spaced apart from a second panel with a honeycomb structure positioned between the first panel and the second panel; and
a fastener comprising a head connected to a shaft, wherein:
the head has a greater dimension than a dimension of the first opening; and
with the head positioned in contact with a countersink wall connected to the sidewall of the receptacle and covering the first opening, the first opening of the receptacle is closed, wherein the flow path further extends from the vent opening along an outside surface of the sidewall of the receptacle and along an outer wall surface of the countersink wall.

13. The fastener assembly of claim 12, wherein:
the honeycomb structure comprises a plurality of hollow tube structures; and
each hollow tube structure of the plurality of hollow tube structures has a first end adhered to the first panel and a second end adhered to the second panel.

14. The fastener assembly of claim 13, wherein the hole, which extends through the honeycomb core panel is positioned adjacent to at least one hollow tube structure of the plurality of hollow tube structures, which forms an open pocket configuration.

15. The fastener assembly of claim 14, wherein the receptacle positioned within the hole has the vent opening adjoining the open pocket configuration.

16. The fastener assembly of claim 14, wherein the open pocket configuration is positioned adjoining the outer wall surface of the countersink wall.

17. The fastener assembly of claim 16, further includes an overlay positioned onto an outer surface of the first panel, covering the hole which extends through the honeycomb core panel and forming a spaced apart region between the overlay and the head of the fastener adjoining the open pocket configuration which adjoins the outer wall surface of the countersink wall.

18. The fastener assembly of claim 17, further includes the overlay adhered to the outer surface of the first panel forming an air tight seal between the overlay and the first panel.

19. The fastener assembly of claim 12, wherein with the receptacle positioned within the hole, the base is positioned against the second panel and the receptacle is positioned spaced apart from an outer surface of the first panel.

20. The fastener assembly of claim 12, wherein the base is adhered to the second panel forming an air tight seal between the base and the second panel.

* * * * *